(12) United States Patent
Ku et al.

(10) Patent No.: US 12,130,665 B2
(45) Date of Patent: Oct. 29, 2024

(54) WIRELESS CHARGING PAD FOR ELECTRONIC DEVICES

(71) Applicant: Intel Corporation, Santa Clara, CA (US)

(72) Inventors: Jeff Ku, Taipei (TW); Gavin Sung, Taipei (TW); Ivan Wang, Taipei (TW); Tim Liu, New Taipei (TW); Jason Y. Jiang, Taipei (TW)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 17/230,724

(22) Filed: Apr. 14, 2021

(65) Prior Publication Data

US 2021/0234403 A1    Jul. 29, 2021

Related U.S. Application Data

(63) Continuation of application No. 16/085,951, filed as application No. PCT/US2016/025788 on Apr. 2, 2016, now abandoned.

(51) Int. Cl.
*H02J 50/10* (2016.01)
*G06F 1/16* (2006.01)
(Continued)

(52) U.S. Cl.
CPC .......... *G06F 1/1632* (2013.01); *G06F 1/1616* (2013.01); *G06F 1/1681* (2013.01);
(Continued)

(58) Field of Classification Search
CPC .................................................. G06F 1/1632
(Continued)

(56) References Cited

U.S. PATENT DOCUMENTS

| 8,723,642 B2 | 5/2014 | Park et al. |
| 8,823,319 B2 | 9/2014 | Von Novak, III et al. |

(Continued)

FOREIGN PATENT DOCUMENTS

| KR | 20120120692 | 11/2012 |
| WO | 2017171892 | 10/2017 |

OTHER PUBLICATIONS

International Searching Authority, "International Search Report and Written Opinion," issued in connection with International Patent Application No. PCT/US2016/025788, dated Dec. 13, 2016, 8 pages.

(Continued)

*Primary Examiner* — Yalkew Fantu
(74) *Attorney, Agent, or Firm* — Hanley, Flight & Zimmerman, LLC

(57) ABSTRACT

An example portable computer disclosed herein includes a first housing, a keyboard carried by the first housing, a second housing pivotally coupled to the first housing, a display carried by the second housing, a wireless charger, and a pad to carry the wireless charger. The pad is pivotally coupled to the first housing. The pad is moveable relative to the first housing between a first orientation to position the wireless charger above the first housing and a second orientation to position the wireless charger adjacent the first housing. The pad to support a body part of a user adjacent the keyboard when the pad is in the first orientation. The pad is to support an external electronic device proximate the wireless charger when the pad is in the second orientation.

20 Claims, 11 Drawing Sheets

(51) Int. Cl.
  *G06F 1/26* (2006.01)
  *H02J 7/00* (2006.01)
  *H02J 50/80* (2016.01)

(52) U.S. Cl.
  CPC ............ *G06F 1/266* (2013.01); *H02J 7/0042* (2013.01); *H02J 7/0044* (2013.01); *H02J 50/10* (2016.02); *H02J 50/80* (2016.02)

(58) Field of Classification Search
  USPC ........................................................ 320/108
  See application file for complete search history.

(56) References Cited

U.S. PATENT DOCUMENTS

| | | | | |
|---|---|---|---|---|
| 2006/0133024 | A1* | 6/2006 | Kim | G06F 1/169 |
| | | | | 361/679.55 |
| 2009/0111531 | A1* | 4/2009 | Cui | H01Q 1/243 |
| | | | | 455/572 |
| 2012/0268238 | A1* | 10/2012 | Park | H02J 7/0044 |
| | | | | 340/5.8 |
| 2014/0253024 | A1* | 9/2014 | Rautiainen | G06F 1/1632 |
| | | | | 320/108 |
| 2015/0002086 | A1* | 1/2015 | Matos | H02J 7/00 |
| | | | | 320/108 |
| 2015/0256021 | A1* | 9/2015 | Kwon | H02J 7/0042 |
| | | | | 320/108 |
| 2017/0090516 | A1* | 3/2017 | Ku | H02J 7/0042 |
| 2019/0036371 | A1 | 1/2019 | Ku et al. | |

OTHER PUBLICATIONS

International Searching Authority, Written Opinion, issued in connection with International Patent Application No. PCT/US2016/025788, dated Dec. 13, 2016, 12 pages.

International Bureau, "International Preliminary Report on Patentability," issued in connection with International Patent Application No. PCT/US2016/025788, dated Oct. 2, 2018, 13 pages.

United States Patent and Trademark Office, "Requirement for Restriction," issued in connection with U.S. Appl. No. 16/085,951, dated Jan. 8, 2020, 6 pages.

United States Patent and Trademark Office, "Non-Final Office Action," issued in connection with U.S. Appl. No. 16/085,951, dated Apr. 15, 2020, 7 pages.

United States Patent and Trademark Office, "Final Office Action," issued in connection with U.S. Appl. No. 16/085,951, dated Oct. 15, 2020, 9 pages.

United States Patent and Trademark Office, "Advisory Action," issued in connection with U.S. Appl. No. 16/085,951, dated Jan. 19, 2021, 4 pages.

* cited by examiner

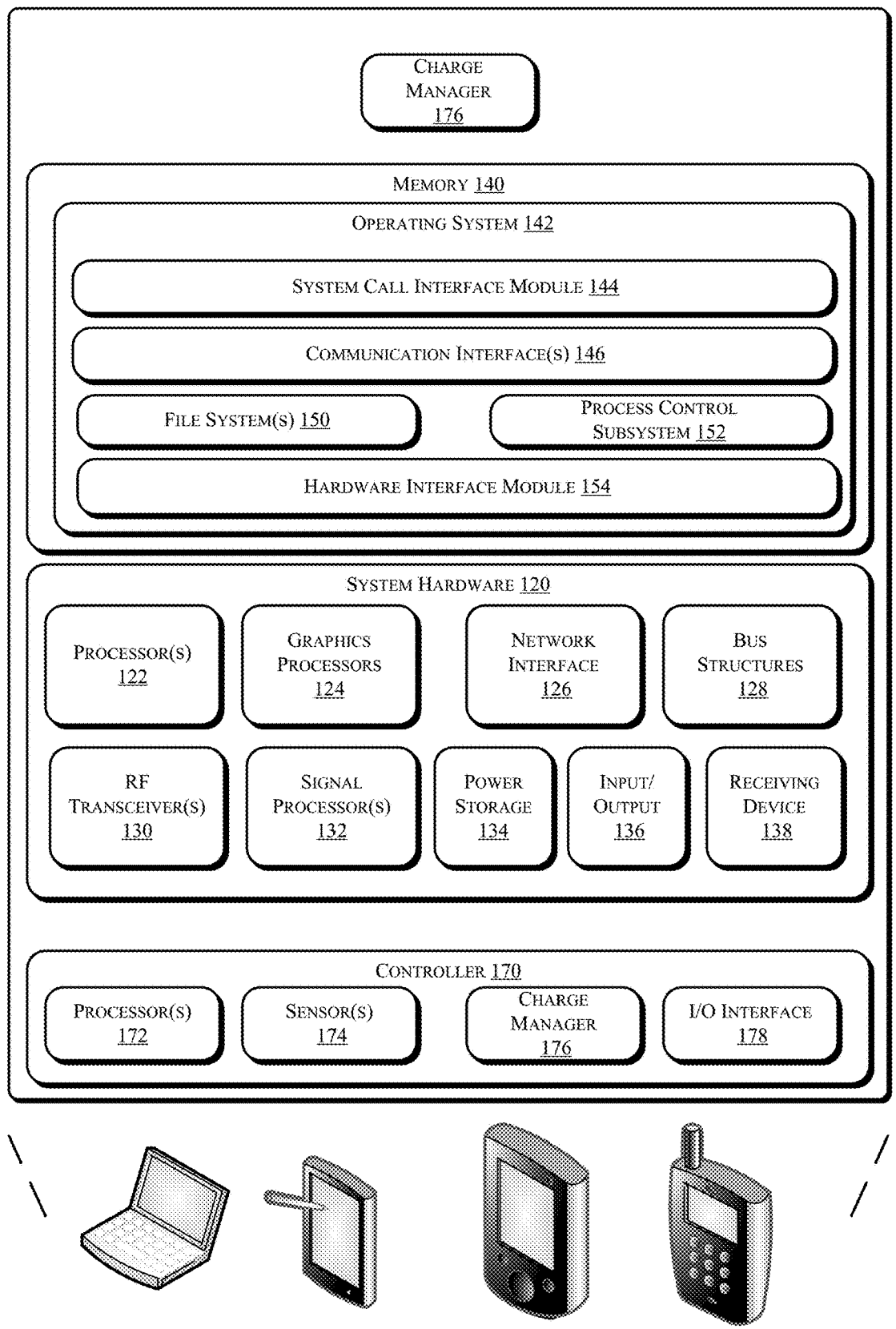
FIG. 1     ELECTRONIC DEVICE 100

WIRELESS CHARGING PAD FOR ELECTRONIC DEVICES

CROSS-REFERENCE TO RELATED APPLICATIONS

This Patent arises as a continuation application of U.S. patent application Ser. No. 16/085,951, entitled Wireless Charging Pad for Electronic Devices, filed on Sep. 17, 2018, which is a 35 U.S.C. § 371 national stage of International Patent Application Serial Number PCT/US2016/025788, filed on Apr. 2, 2016. U.S. patent application Ser. No. 16/085,951 and International Patent Application Serial Number PCT/US2016/025788 are hereby incorporated herein by reference in their entireties.

BACKGROUND

The subject matter described herein relates generally to the field of electronic devices and more particularly to a wireless charging pad for electronic devices.

Wireless charging platforms for electronic devices typically incorporate a wireless power transmitting device which may be coupled, either by inductance or by capacitance, to a wireless power receiving device in an electronic device. Strong coupling between wireless power transmitting device and the wireless power receiving device is useful to support efficient wireless charging. Accordingly, wireless charging pads for electronic devices may find utility.

BRIEF DESCRIPTION OF THE DRAWINGS

The detailed description is described with reference to the accompanying figures.

FIG. 1 is a schematic illustration of an electronic device which may be adapted to implement wireless charging pads in accordance with some examples.

DETAILED DESCRIPTION

Figure 2A:
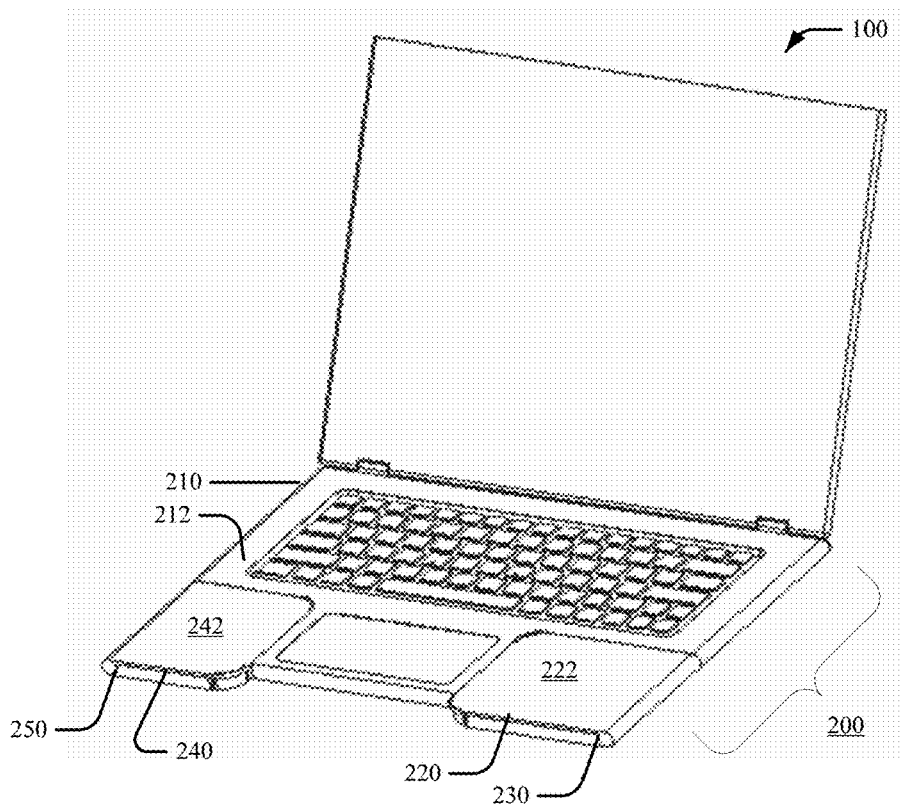
FIGS. 2A and 2B are schematic perspective views of an electronic device which includes wireless charging pads in accordance with some examples.

Described herein are exemplary systems and methods to implement a wireless charging pad in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide coupling techniques between wireless charging systems and electronic device(s). In some examples the subject matter described herein addresses these and other issues by providing an electronic device with chassis comprising a body formed from a rigid material and comprising one or more wireless charging pads coupled to the body by a hinge such that wireless charging pad(s) are rotatable about the hinge(s) between a first position in which the wireless charging pad(s) are closed and a second position in which the wireless charging pad(s) are open. The wireless charging pad(s) comprise one or more wireless power transmitting devices.

When the wireless charging pad(s) are in the closed position the wireless power transmitting device(s) are positioned proximate a wireless power receiving device in the electronic device which is coupled to at least one power storage device. By contrast, when the wireless charging pad(s) are in the open position the wireless power transmitting device(s) are positioned such that a remote electronic device may be positioned on the wireless charging pad(s) in order to receive power from the wireless power transmitting device(s).

Additional features and operating characteristics of the electronic device and associated system are described below with reference to FIGS. 1-10.

FIG. 1 is a schematic illustration of an electronic device 100 which may be adapted to include one or more wireless charging pads in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel R Atom™ processors, Intel R Atom™ based System-on-a-Chip (SOC) or Intel® Core2 Duo® or i3/i5/i7 series processor available from Intel Corporation, Santa Clara, California, USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003).

Another example of a wireless interface would be a general packet radio service (GPRS) interface (see, e.g., Guidelines on GPRS Handset Requirements, Global System for Mobile Communications/GSM Association, Ver. 3.0.1. December 2002). Bus structures 128 connect various components of system hardware 120. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card, International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, and a signal processing module 132 to process signals received by RF transceiver 130. RF transceiver may implement a local wireless connection via a protocol such as, e.g., Bluetooth or 802.11X.

IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more power storage devices 134, e.g., batteries, and one or more input/output interfaces 136 such as, e.g., a keypad and/or a display. In some examples electronic device 100 may not have a keypad and use the touch panel for input.

Electronic device 100 may further include at least one wireless power receiving device 138 to receive power via an electromagnetic coupling with a driven coil in a charging device. The wireless power receiving device 138 may comprise one or more coil(s) to receive power through an inductive coupling with a driven coil or coupling charge plate(s) to receive power through a capacitive coupling with a driven capacitor in the charging device.

Memory 140 may include an operating system 142 for managing operations of electronic device 100. In one embodiment, operating system 142 includes a hardware interface module 154 that provides an interface to system hardware 120. In addition, operating system 142 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 140. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms.

In the embodiment depicted in FIG. 1 the controller 170 comprises a processor 172, a sensor 174, a charge manager 176, and an I/O interface 178. In some examples sensor(s) 174 may include a wireless communication capability to detect the presence of electronic device 100. Alternatively, sensor(s) 174 may comprise one or more of an optical sensor which detects the presence of electronic device 100 or a pressure sensor to detect the positioning of electronic device 100 on the wireless power receiving device(s) 216, 218 (e.g., one or more chargers). The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122. In some examples portions of the charge manager 176 may reside in the memory 140 of electronic device 100 and may be executable on one or more of the processors 122.

Referring to FIGS. 2A-2B, 3A-3B and 4A-4C in some examples an electronic device 100 comprises at least one electronic component, at least one power storage device 134, and a chassis 200 comprising a body 210 formed from a rigid material, e.g. a rigid polymer, metal, or composite material. In some examples the body 210 comprises a first major surface 212.

Electronic device 100 may further comprise one or more wireless power receiving devices 216, 218 which may be embedded in the chassis 200 of the electronic device. In some examples, the wireless power receiving device(s) 216, 218 may comprise one or more coil(s) to receive power through an inductive coupling with a driven coil or one or more coupling charge plate(s) to receive power through a capacitive coupling with a driven capacitor in the charging device.

Figure 2B:
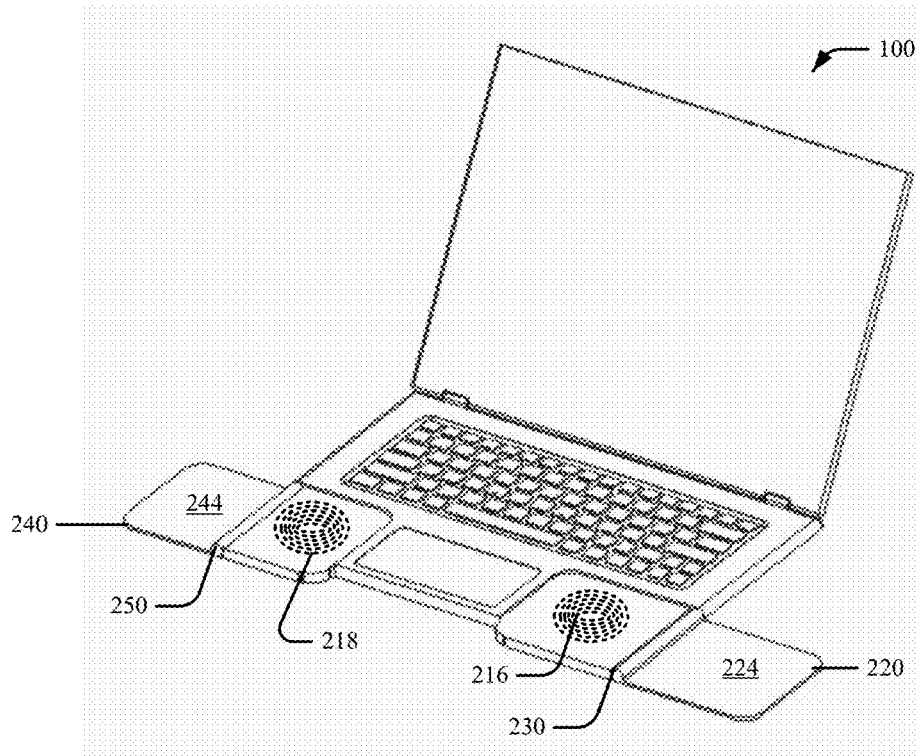
Figure 3A:
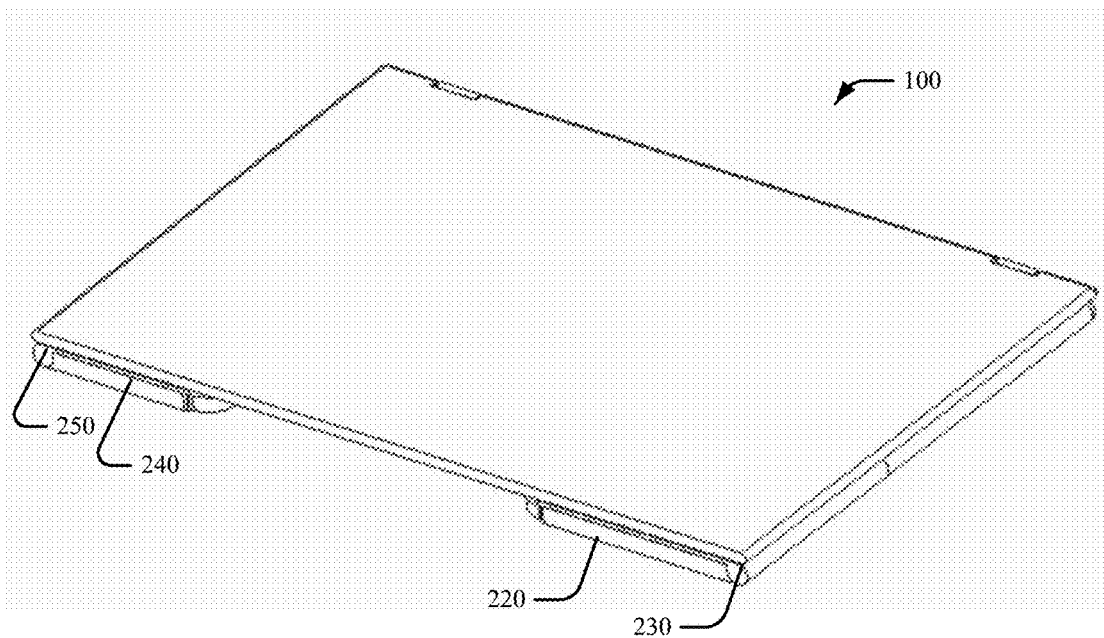
FIGS. 3A and 3B are schematic perspective views of an electronic device which includes wireless charging pads in accordance with some examples.
Figure 3B:
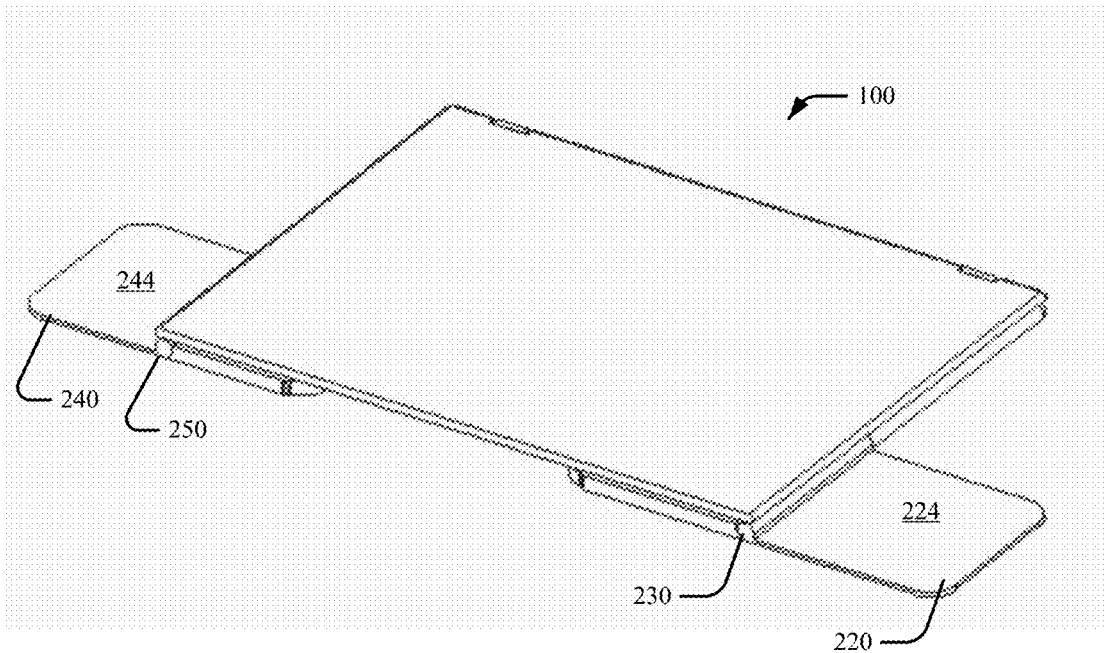

In some examples chassis 200 comprises a first pad 220 coupled to the body 210 by a first hinge 230. The first pad 220 is rotatable about the first hinge 230 between a first position in which the first pad 220 is closed (FIGS. 2A, 3A, 4B) and a second position in which the first pad 220 is open (FIG. 2B). The first pad 220 comprises a first major surface 222 (FIG. 2A) and a second major surface 224 (FIG. 2B) opposite the first major surface 222. In some examples the first hinge 230 is mounted on a side of the body 210 such that the when the first pad 220 is in the closed position the first major surface 222 of the first pad 220 lies in a plane which is substantially parallel to the first major surface 212 of the body, as depicted in FIG. 2A. By contrast, when the first pad 220 is in the open position the first major surface 222 of the first pad lies in a plane which is substantially parallel to a second major surface 214 of the body, as illustrated in FIGS. 2B, 3B, and 4C. In some examples, the first pad 220 can include one or more rib features 232 (FIG. 4C) which elevate pad 220 when it is in the open position so that first major surface 222 is substantially parallel with the second major surface 214 of the body.

In some examples chassis 200 may further comprise a second pad 240 coupled to the body by a second hinge 250. The second pad 240 is rotatable about the second hinge 250 between a first position in which the second pad 240 is closed (FIG. 2A, 3A, 4B) and a second position in which the second pad 240 is open (FIG. 2B, 3B, 4C). The second pad 240 comprises a first major surface 242 and a second major surface 244. In some examples the second hinge 250 is mounted on a side of the body 210 such that the when the second pad 240 is in the closed position the first major surface 242 of second pad 240 is substantially coplanar with the first major surface 212 of the body 210. By contrast, when the second pad 240 is in the open position the first major surface 242 of the second pad is substantially coplanar with the second major surface 214 of the body.

Figure 4A:
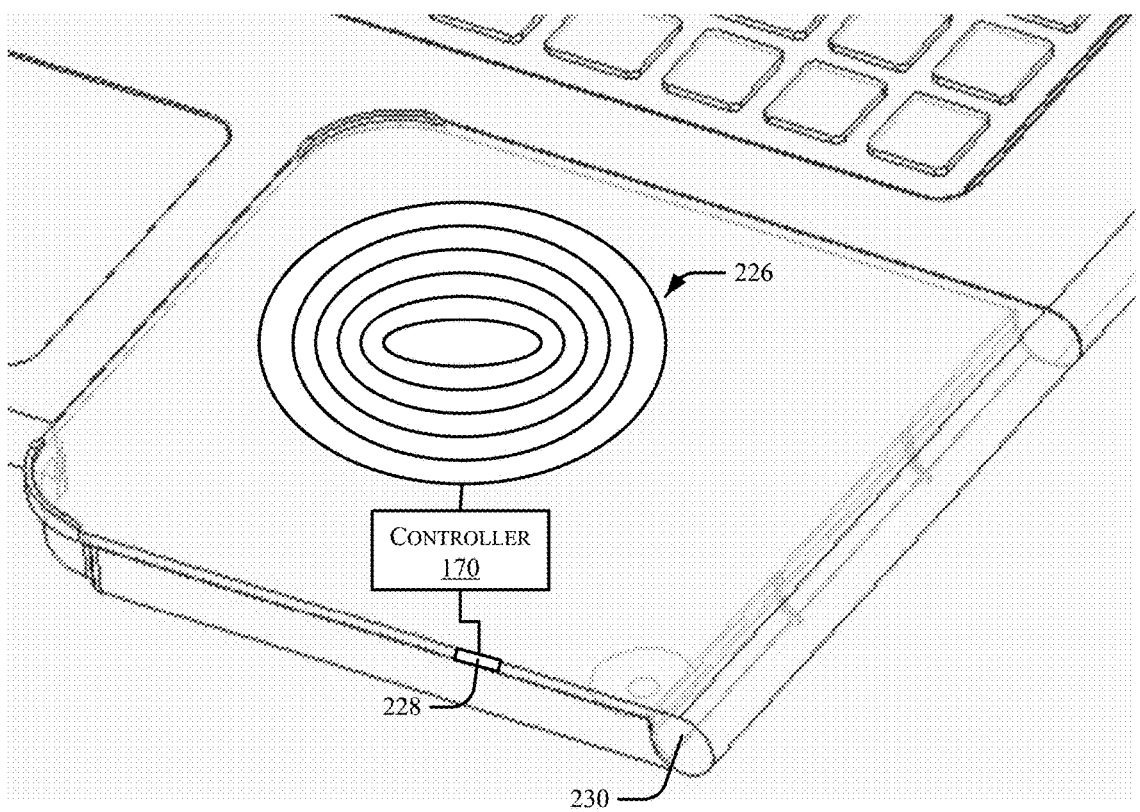
FIG. 4A is a schematic, perspective view of a wireless charging pad in accordance with some examples.
Figure 4B:
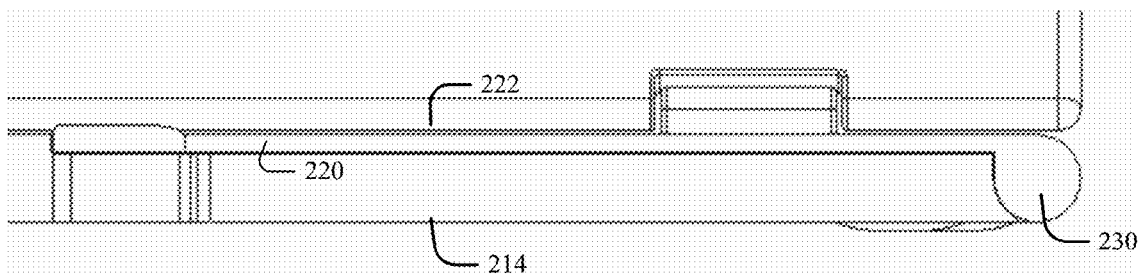
FIGS. 4B-4C are side views of a wireless charging pad in accordance with some examples.
Figure 4C:
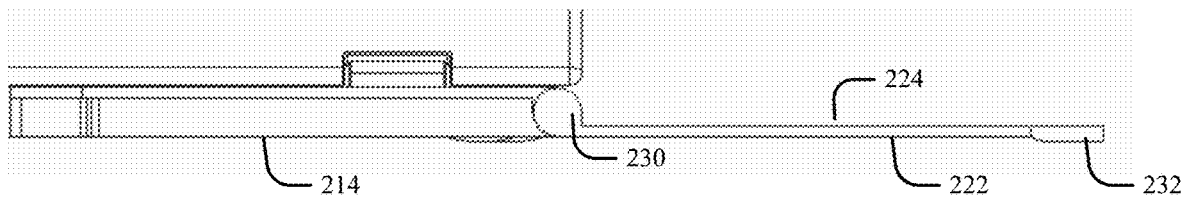

As illustrated in FIG. 4A, in some examples at least one of the first pad 220 or the second pad 240 comprises a wireless power transmitting device 226. In some examples the wireless power transmitting device 226 may be implemented as an inductive charging coil as depicted in FIG. 4A. In alternate examples the wireless power transmitting device may be implemented as a capacitive charging plate. The wireless power transmitting device 226 may be communicatively coupled to the charge manager 176 depicted in FIG. 1. In some examples the controller 170 depicted in FIG. 1 may be embedded in the one of the first pad 220 or the second pad 240 and may be coupled to a power receptacle 228.

In some examples, when the first pad 220 is in the closed position the first wireless power transmitting device 226 is positioned proximate a wireless power receiving device 216 in the chassis 200 such that when power is provided to the first wireless power transmitting device 226, the first wireless power transmitting device can transmit the power to the wireless power receiving device 216, which may be coupled to the at least one power storage device 134. By contrast when the first pad 220 is in the open position the first wireless power transmitting device 226 is positioned such that a remote electronic device may be positioned on the first pad 220 in order to receive power from the first wireless power transmitting device 226.

Similarly, when the second pad 240 is in the closed position the second wireless power transmitting device (if included) is positioned proximate a second wireless power receiving device 218 such that when power is provided to the second wireless power transmitting device 226, the second wireless power transmitting device can transmit the power to the wireless power receiving device 218, which may be coupled to the at least one power storage device 134.

By contrast, when the second pad 240 is in the open position the second wireless power transmitting device is positioned such that a remote electronic device may be positioned on the second pad 240 in order to receive power from the second wireless power transmitting device.

Figure 5A:
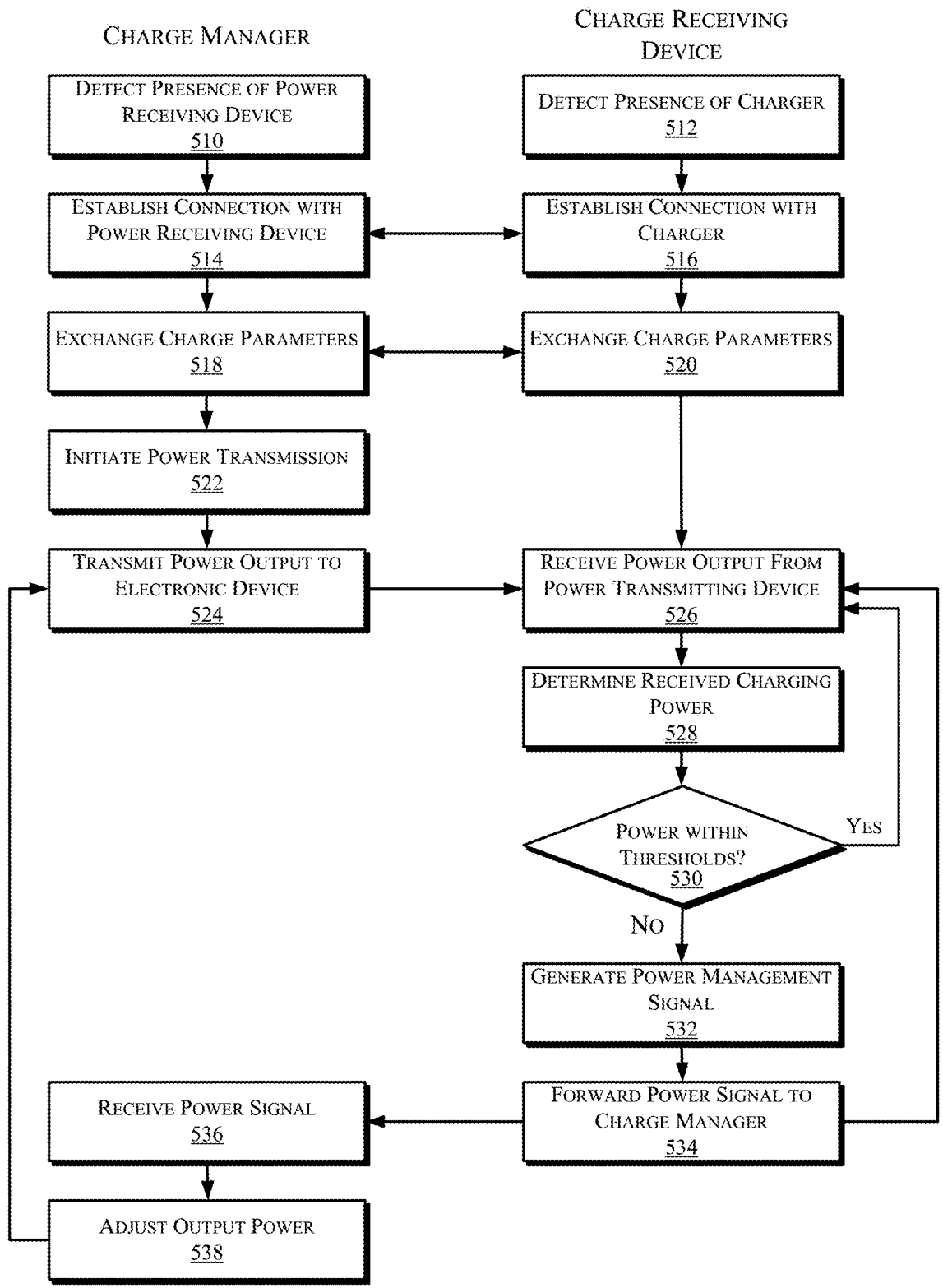
FIGS. 5A-5B are flowcharts illustrating operations in a method to operate a wireless charging pad of an electronic device in accordance with some examples.

In some examples the charge manager 176 interacts with one or more other components of the electronic device 100 to manage operations of one or more wireless charging devices such as wireless charging device 226. Referring first to FIG. 5A, in some examples the charge manager 176 implements operations which manage charge operations between one or more wireless charging devices 226 and a charge receiving device in a remote electronic device.

Referring to FIG. 5A, at operation 510 one or more of the sensor(s) 174 in the controller 170 detects the presence of a power receiving device. In some examples the power receiving device may be a wireless power receiving device in a remote electronic device. Similarly, at operation 512 the power receiving device detects the presence of a charger such as a wireless power transmitting device 226.

At operation 514 the charge manager 176 establishes a communication connection with the remote electronic device, and similarly at operation 516 the remote electronic device establishes a communication connection with the charge manager. In an example in which one or more of the charging pads 220, 240 are in the open position the I/O interface 178 in the controller 170 may establish a communication connection with a charge receiving device within a remote electronic device proximate the one or more charging pads 220, 240. The communication connection may be established via a wireless communication interface or by a wired interface.

At operations 518 and 520 the charge manager 176 and the charge receiving device exchange charge parameters. In an example in which one or more of the charging pads 220, 240 are in the open position the charge manager 176 in the controller 170 may exchange charge parameters with a remote electronic device via communication connection established in operations 514 and 516. For example, the charge manager may convey to the remote electronic device a maximum charge output available from the wireless power transmitting device(s) 226.

Similarly, the remote electronic device may convey to the charge manager 176 a minimum charge threshold and a maximum charge threshold for the charge receiving device.

At operation 522 the charge manager 176 initiates power transmission, e.g., by coupling wireless power transmitting device(s) 226 (e.g., wireless charging device(s)) to one or more power source(s) via the power receptacle 228. In operation, the charge manager 176 monitors the power output of the wireless power transmitting device(s) 226, which may be transmitted to the electronic device 100 via the communication connection established at operation 335.

At operation 526 the electronic device receives the power output transmitted from the charge manager at operation 524. At operation 528 the charge receiving device determines the received power output of the wireless power receiving device(s) 226 in electronic device 100. At operation 530 the charge receiving device determines whether the receiving power is within charging thresholds for the charge receiving device.

If, at operation 530 the received power is within threshold values then control passes back to operation 526. Thus, operations 526 to 530 define a loop pursuant to which the charge receiving device continues to monitor the power received from the one or more wireless charging devices 226 in the electronic device 100.

By contrast, if at operation 530 the received power is not within threshold values then control passes to operation 532 and the charge receiving device generates a power management signal. In some examples the power management signal may indicate that the charge manager 176 should modify power output parameters for the wireless charging device(s) 226 on electronic device 100. At operation 534, the power management signal is forwarded to the charge manager 176 e.g., via the communication connection established in operations 352-516.

At operation 536 the charge manager 176 receives the power management signal transmitted by the charge manager 176 at operation 534. At operation 538 the charge manager 176 adjusts a charge parameter (e.g., the output power) of the wireless charging device(s) 226 in response to the power management signal.

In an example in which one or more of the charging pads 220, 240 are in the closed position the charge manager 176 may manage both the wireless power transmitting device(s) 226 and the wireless power receiving device(s) 216, 218 on electronic device 100 to enable charging of the electronic device 100 via the wireless charging pads 220, 240. In some examples the charge manager 176 implements operations which manage charge operations between one or more wireless charging devices 226 and one of the wireless power receiving devices 216, 218.

Figure 5B:
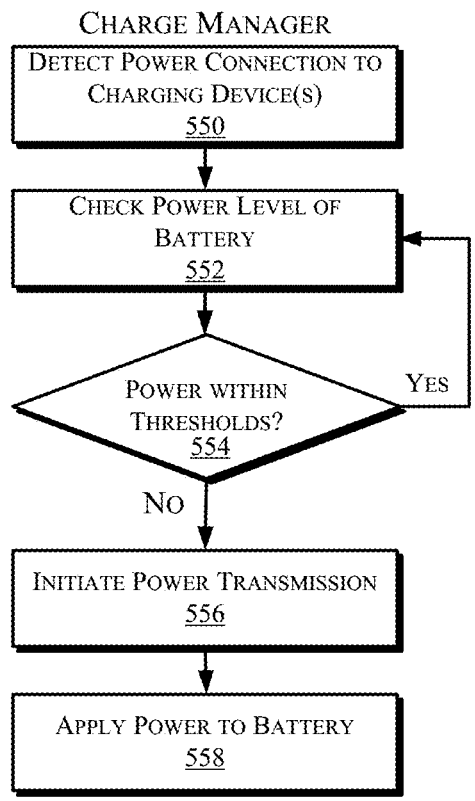

Referring to FIG. 5B, at operation 550 the charge manager 176 may detect a power connection to one or both of the charging pads 220, 240, e.g., via power receptacle 228. At operation 552 the charge manager 176 may check a power level of a battery for electronic device 100. At operation 554 the charge manager 176 may determine whether the power level of the batter is within a power threshold which indicates that the battery does not need to be charged. For example, if the battery is at a charge level that exceeds a minimum threshold, e.g., 70%, then the battery may not need to be charged.

If, at operation 554, the power level of the batter is within a power threshold which indicates that the battery does not need to be charged then control passes back to operation 552 and the charge manager 176 continues to monitor the charge level of the battery. By contrast, if at operation 554 the power level of the battery indicates that the battery needs to be charged then control passes to operation 556 and the charge manager 176 initiates power transmission from the one or more wireless power transmitting device(s) 226. Power transmitted from wireless power transmitting device (s) 226 is received at the wireless power receiving device(s) 216, 218 on electronic device 100 and at operation 558 the power is applied to the battery to enable charging of the electronic device 100 via the wireless charging pads 220, 240.

Figure 6:
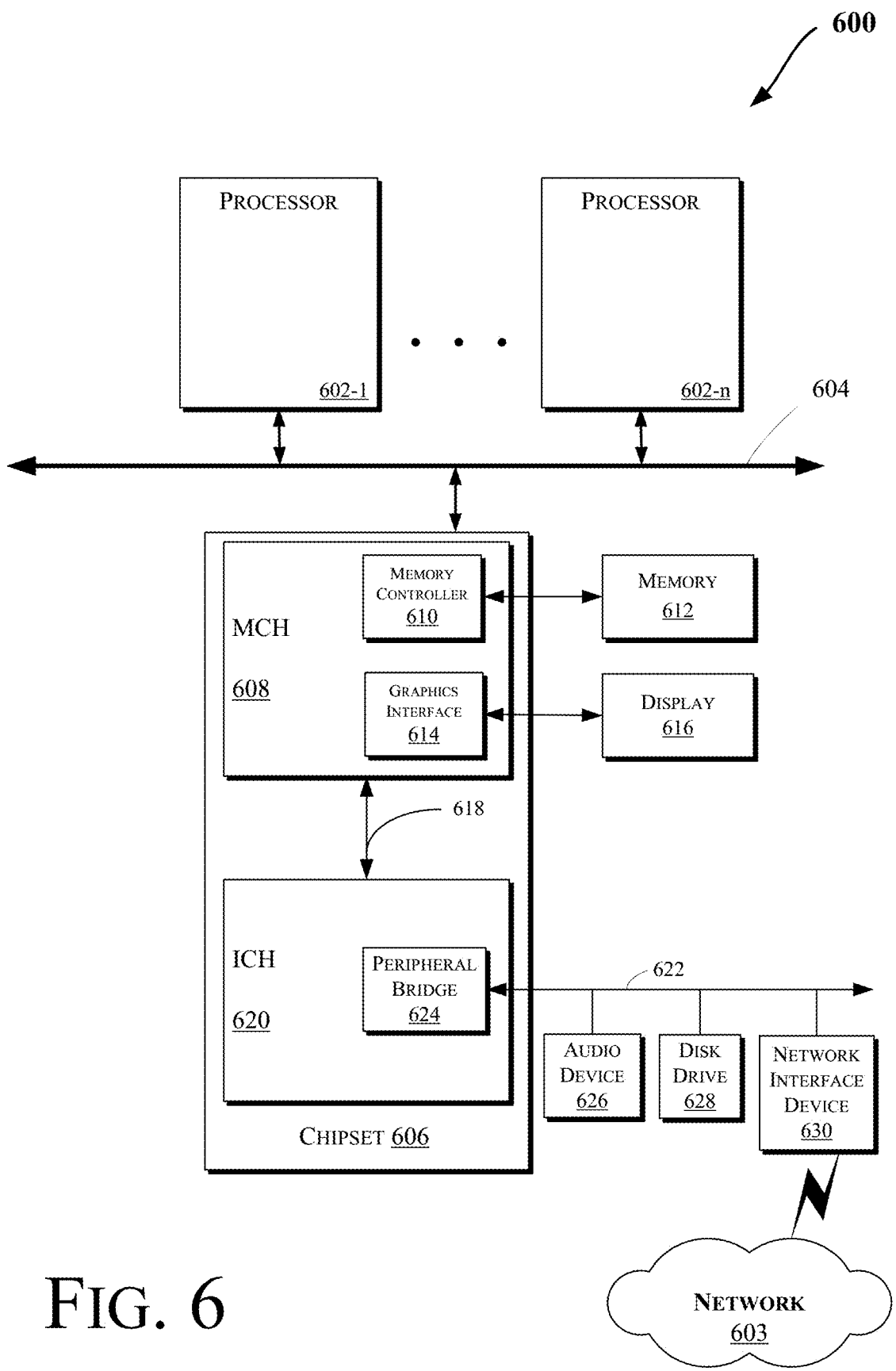
FIGS. 6-10 are schematic illustrations of electronic devices which may be adapted to include a wireless charging pad in accordance with some examples.

As described above, in some examples the electronic device may be embodied as an information processing system. FIG. 6 illustrates a block diagram of an information processing system 600 in accordance with an example. The information processing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the system hardware 120 discussed with reference to FIGS. 1-3. Also, the operations discussed with reference to FIGS. 3-5 may be performed by one or more components of the system 600.

A chipset 606 may also communicate with the interconnection network 601. The chipset 606 may include a memory control hub (MCH) 608. The MCH 608 may include a memory controller 610 that communicates with a memory 612 (which may be the same or similar to the memory 140 of FIG. 1). The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 603, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics interface 616 may be included within the MCH 608 in other examples.

Furthermore, the information processing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
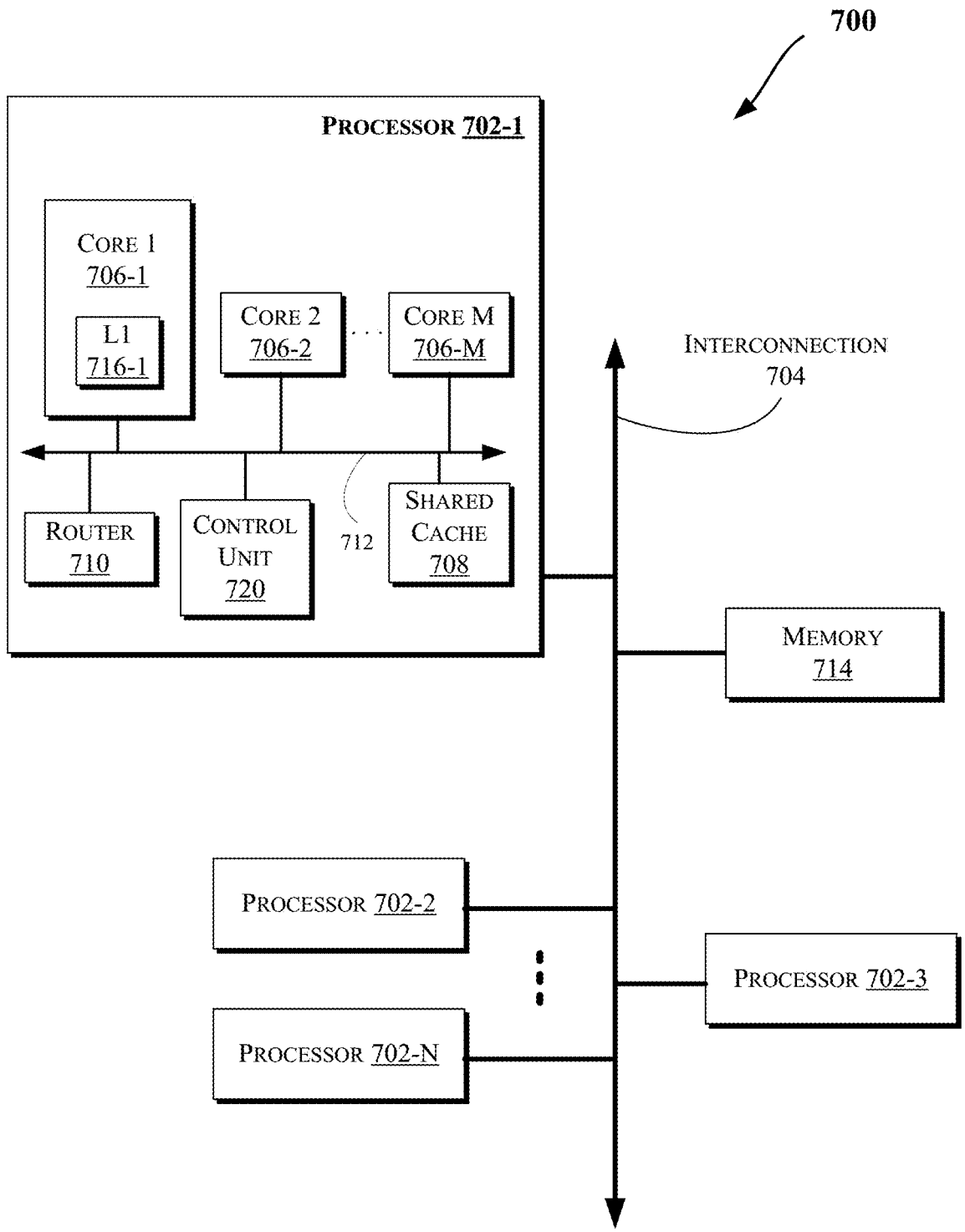

FIG. 7 illustrates a block diagram of an information processing system 700, according to an example. The information processing system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716"). In one example, the control unit 720 may include logic to implement the operations described above with reference to FIGS. 5A-5B.

Figure 8:
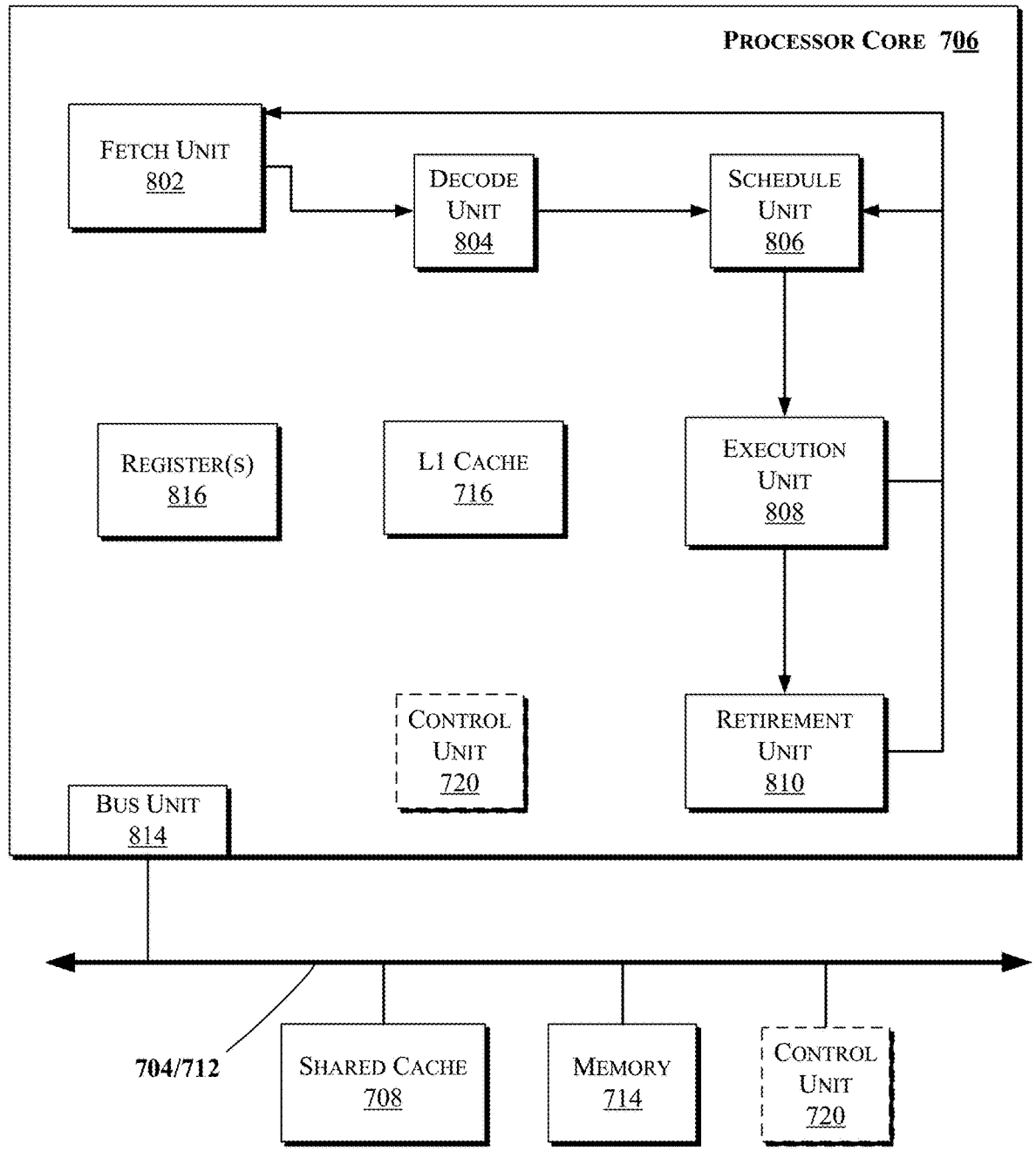

FIG. 8 illustrates a block diagram of portions of a processor core 706 and other components of an information processing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of micro-operations.

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 712 to enable communication between components of the processor core 706 and other components (such as the components discussed with reference to FIG. 8) via one or more buses (e.g., buses 704 and/or 712). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
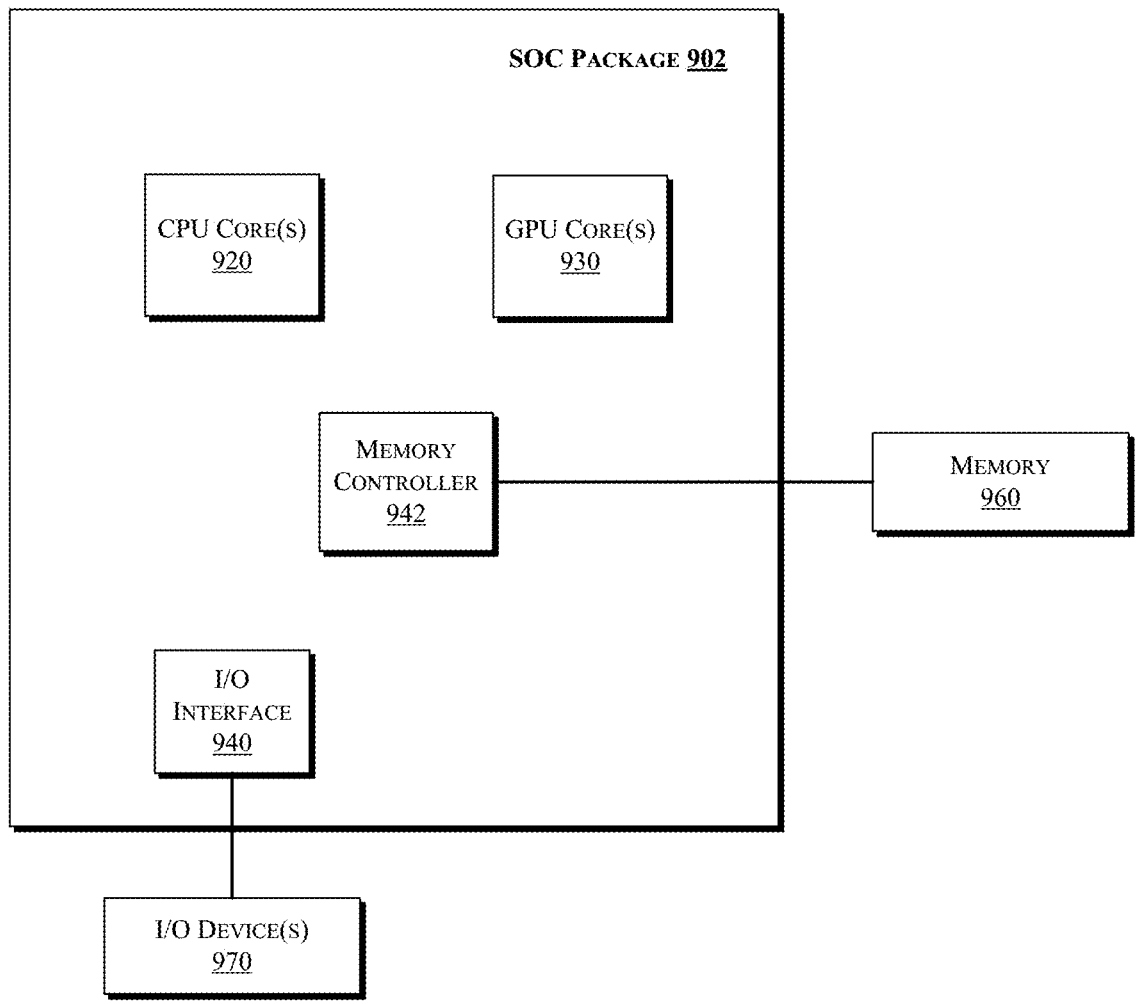

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
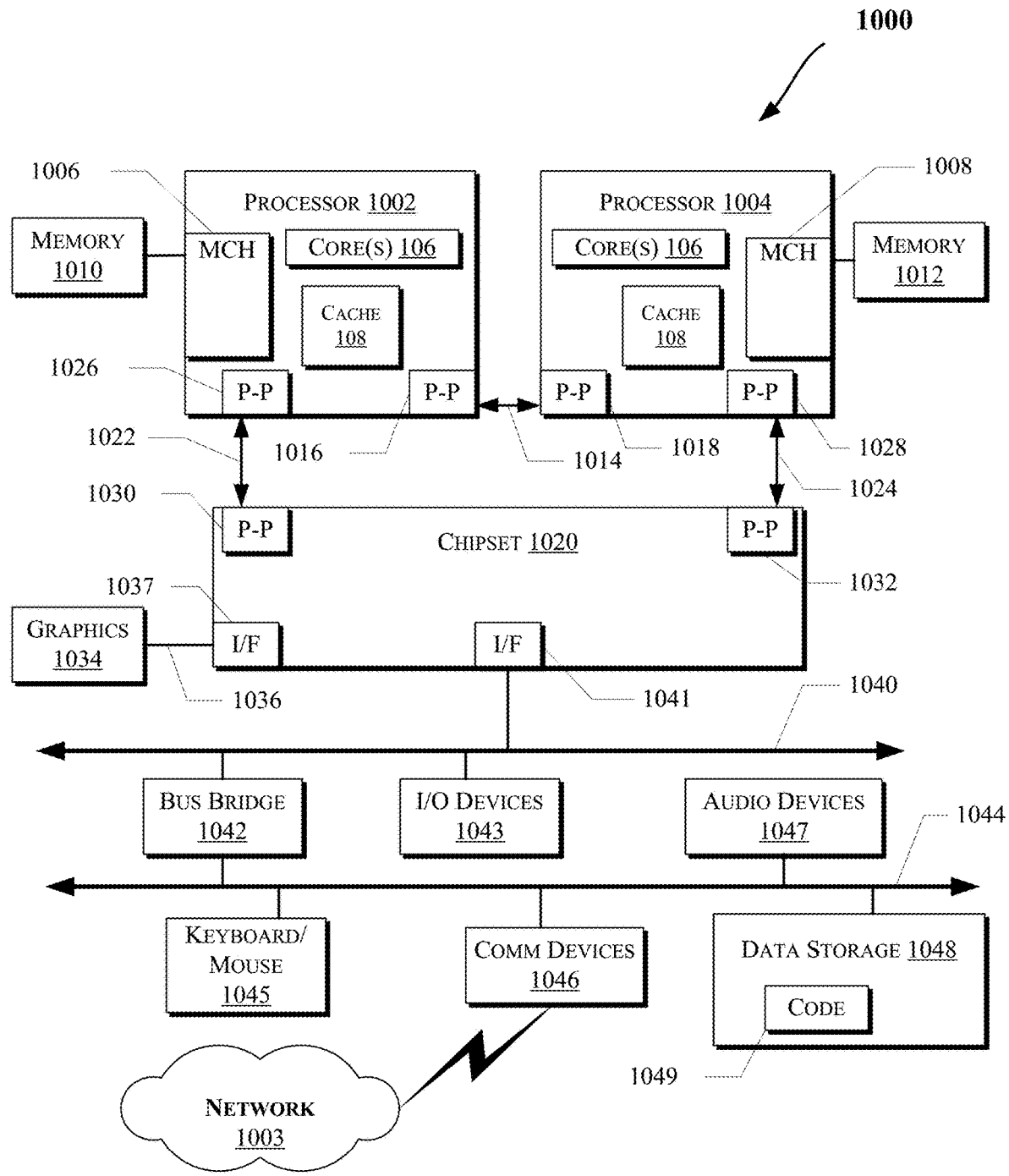

FIG. 10 illustrates an information processing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 5 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1042 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is a chassis for an electronic device, comprising a body formed from a rigid material and comprising a first pad coupled to the body by a first hinge, wherein the first pad is rotatable about the first hinge between a first position in which the first pad is closed and a second position in which the first pad is open, wherein the first pad comprises a first wireless power transmitting device.

In Example 2, the subject matter of Example 1 can optionally include an arrangement in which the body comprises a first major surface and a second major surface opposite the first major surface, the first pad comprises a first major surface and a second major surface, and the first hinge is mounted on a side of the body such that the when the first pad is in the closed position the first major surface of the first pad lies in a plane which is substantially parallel to the first major surface of the body.

In Example 3, the subject matter of any one of Examples 1-2 can optionally include an arrangement in which when the first pad is in the open position the first major surface of the first pad lies in a plane which is substantially parallel to the second major surface of the body.

In Example 4, the subject matter of any one of Examples 1-3 can optionally include a second pad coupled to the body by a second hinge, wherein the second pad is rotatable about the second hinge between a first position in which the second pad is closed and a second position in which the second pad is open.

In Example 5, the subject matter of any one of Examples 1-4 can optionally include an arrangement in which the second pad comprises a second wireless power transmitting device.

In Example 6, the subject matter of any one of Examples 1-5 can optionally include an arrangement in which the body comprises a first major surface and a second major surface, the second pad comprises a first major surface and a second major surface, and the second hinge is mounted on a side of the body such that the when the second pad is in the closed position the first major surface of second pad is substantially coplanar with the first major surface of the body.

In Example 7, the subject matter of any one of Examples 1-6 can optionally include an arrangement in which when the second pad is in the open position the first major surface of the second pad lies in a plane which is substantially parallel to the second major surface of the body.

Example 8 is an electronic device, comprising at least one electronic component, a least one power storage device, and a chassis comprising a body formed from a rigid material and comprising a first pad coupled to the body by a first hinge, wherein the first pad is rotatable about the first hinge between a first position in which the first pad is closed and a second position in which the first pad is open, wherein the first pad comprises a first wireless power transmitting device.

In Example 9, the subject matter of Example 8 can optionally include an arrangement in which when the first pad is in the closed position the first wireless power transmitting device is positioned proximate a wireless power receiving device coupled to the at least one power storage device.

In Example 10, the subject matter of any one of Examples 8-9 can optionally include an arrangement in which when the first pad is in the open position the first wireless power transmitting device is positioned such that a remote electronic device may be positioned on the first pad in order to receive power from the first wireless power transmitting device.

In Example 11, the subject matter of any one of Examples 8-10 can optionally include at least one sensor to detect a remote electronic device proximate the first wireless power transmitting device, and a controller comprising logic, at least partly including hardware logic, to determine a charging power parameter for the remote electronic device, generate a transmit power from the first wireless power transmitting device based at least in part on the charging power parameter.

In Example 12, the subject matter of any one of Examples 8-11 can optionally include logic, at least partially including hardware logic, configured to establish a communication connection with the remote electronic device and receive the charging power parameter from the remote electronic device.

In Example 13, the subject matter of any one of Examples 8-12 can optionally include logic, at least partly including hardware logic, to receive a power management signal from the remote electronic device and adjust the transmit power from the first wireless power transmitting device based at least in part on the power management signal.

In Example 14, the subject matter of any one of Examples 8-13 can optionally include a second pad coupled to the body by a second hinge, wherein the second pad is rotatable about the second hinge between a first position in which the first pad is closed and a second position in which the second pad is open.

In Example 15, the subject matter of any one of Examples 8-14 can optionally include an arrangement in which the second pad comprises a second wireless power transmitting device.

In Example 16, the subject matter of any one of Examples 8-15 can optionally include an arrangement in which when the second pad is in the closed position the second wireless power transmitting device is positioned proximate a second wireless power receiving device coupled to the at least one power storage device.

In Example 17, the subject matter of any one of Examples 8-16 can optionally include an arrangement in which when the second pad is in the open position the second wireless power transmitting device is positioned such that a remote electronic device may be positioned on the second pad in order to receive power from the second wireless power transmitting device.

In Example 18, the subject matter of any one of Examples 8-17 can optionally include at least one sensor to detect a remote electronic device proximate the second wireless power transmitting device, and a controller comprising logic, at least partly including hardware logic, to determine a charging power parameter for the remote electronic device and generate a transmit power from the second wireless power transmitting device based at least in part on the charging power parameter.

In Example 19, the subject matter of any one of Examples 8-18 can optionally include logic, at least partially including hardware logic, to establish a communication connection with the remote electronic device and receive the charging power parameter from the remote electronic device.

In Example 20, the subject matter of any one of Examples 8-19 can optionally include logic, at least partly including hardware logic, to receive a power management signal from the remote electronic device and adjust the transmit power from the second wireless power transmitting device based at least in part on the power management signal.

Example 21 is a controller comprising logic, at least partly including hardware logic, to determine a charging power parameter for a remote electronic device and generate a transmit power from a wireless power transmitting device based at least in part on the charging power parameter.

In Example 22, the subject matter of Example 21 can optionally include logic, at least partly including hardware logic, to establish a communication connection with the remote electronic device and receive the charging power parameter from the remote electronic device.

In Example 23, the subject matter of any one of Examples 21-22 can optionally include logic, at least partly including hardware logic, to receive a power management signal from the remote electronic device and adjust the transmit power from the second wireless power transmitting device based at least in part on the power management signal.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect. The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A portable computer comprising:
    a first housing;
        a keyboard carried by the first housing;
        a second housing pivotally coupled to the first housing;
        a display carried by the second housing, the display movable relative to the keyboard between a plurality of viewing angles;
        a wireless charger; and
        a pad to carry the wireless charger, the pad pivotally coupled to the first housing, the pad moveable relative to the first housing between a first orientation to position the wireless charger above the first housing and a second orientation to position the wireless charger adjacent the first housing, the pad to support a body part of a user adjacent the keyboard when the pad is in the first orientation, the pad to support an external electronic device proximate the wireless charger when the pad is in the second orientation.

2. The portable computer as defined in claim 1, wherein pad is pivotally coupled to the first housing via a hinge.

3. The portable computer as defined in claim 1, wherein the wireless charger has a first side and a second side, the pad to support the body part above the first side when the pad is in the first position, the electronic device to be proximate the second side when charging.

4. The portable computer as defined in claim 3, wherein the first housing has an upper surface and a lower surface opposite the upper surface, the upper surface having a recessed area to receive the pad when the pad is in the first orientation.

5. The portable computer as defined in claim 4, wherein the first side of the pad is to engage the recessed area and the second side of the pad is flush relative to the upper surface of the first housing when the pad is in the first orientation.

6. The portable computer as defined in claim 1, further including a wireless charging receiver carried by the first housing, the pad to cause the wireless charger to engage the wireless charging receiver when the pad is in the first orientation and cause the wireless charger to disengage the wireless charging receiver when the pad is in the second orientation.

7. The portable computer as defined in claim 1, further including a battery carried by at least one of the first housing or the second housing.

8. The portable computer as defined in claim 7, wherein the wireless charger is to transfer power to charge the battery when the pad is in the first orientation, and the wireless charger is to transmit power to the external electronic device when the pad is in the second orientation.

9. The portable computer as defined in claim 1, wherein the pad is pivotally coupled to a perimeter edge of the first housing.

10. The portable computer as defined in claim 1, wherein the pad includes a power receptacle to receive a power plug to provide power to the wireless charger.

11. The portable computer as defined in claim 1, wherein the first housing and second housing are pivotally coupled to move between an open state and a closed state, the pad is between the first housing and the second housing when the pad is in the first orientation and the first and second housings are in the closed state.

12. A portable computer comprising:
    a chassis having a base with a perimeter;
    a keyboard supported by the chassis;
    a wireless charger; and
    a pad to support the wireless charger, the pad coupled to the base of the chassis via a hinge to enable the pad to rotate between a first orientation and a second orientation relative to the base, in the first orientation, a first side of the pad is to engage an upper surface of the chassis and a second side of the pad opposite the first side of the pad is to support a body part of a user adjacent the keyboard, and, in the second orientation, the first side of the pad is separate from the upper surface of the chassis and outside of the perimeter of the base to facilitate charging of a mobile electronic device positioned outside the perimeter of the base.

13. The portable computer as defined in claim 12, wherein the wireless charger is to charge a first carried by the chassis when the pad is in the first orientation.

14. The portable computer as defined in claim 12, further including a trackpad supported by the chassis, the trackpad adjacent the pad when the pad is in the first orientation.

15. The portable computer as defined in claim 12, wherein the wireless charger is a first wireless charger, the hinge is a first hinge, the pad is a first pad, and further including a second pad and a second wireless charger, the second pad being pivotally coupled to the base via a second hinge to enable the second pad to rotate between a third orientation and a fourth orientation relative to the chassis, the first pad and the second pad on opposite sides of the base, in the third orientation, a third side of the second pad is to engage the upper surface of the chassis, and a fourth side of the second pad opposite the third side of the pad is to support a second body part of the user adjacent the keyboard, and, in the fourth orientation, the third side of the second pad is separate from the upper surface of the chassis and outside of the perimeter of the base to facilitate charging of the mobile electronic device positioned outside the perimeter of the base.

16. The portable computer as defined in claim 12, further including a trackpad supported by the chassis between the first pad and the second pad.

17. A portable computer comprising:
    a chassis having a base with a perimeter;
    a keyboard supported by the chassis;
    a wireless charger; and
    means for supporting the wireless charger, the supporting means pivotable about an edge of the base of the chassis to rotate between a first orientation and a second orientation relative to the base, in the first orientation, the supporting means to engage an upper surface of the chassis to support a body part of a user adjacent the keyboard when a user uses the keyboard, and, in the second orientation, the supporting means is separated from the upper surface of the chassis and outside of the perimeter of the base to facilitate charging of a mobile electronic device positioned outside the perimeter of the base.

18. The portable computer as defined in claim 17, wherein the supporting means is pivotally coupled to the chassis via a hinge.

19. The portable computer as defined in claim 17, wherein the supporting means includes a power receptacle to receive a power plug and provided power to the wireless charger.

20. The portable computer as defined in claim 17, further including a keyboard and a trackpad carried by the chassis, the wireless charger positioned adjacent the keyboard and the trackpad when the supporting means is in the first orientation.

* * * * *